United States Patent
Cole (10) Patent No.: US 12,536,506 B2
(45) Date of Patent: Jan. 27, 2026

(54) SYSTEMS AND METHODS FOR PREDICTING UNEMPLOYMENT RATES

(71) Applicant: ADP, Inc., Roseland, NJ (US)

(72) Inventor: Ramsay Cole, Roxbury, CT (US)

(73) Assignee: ADP, Inc., Roseland, NJ (US)

( * ) Notice: Subject to any disclaimer, the term of this patent is extended or adjusted under 35 U.S.C. 154(b) by 265 days.

(21) Appl. No.: 18/066,565

(22) Filed: Dec. 15, 2022

(65) Prior Publication Data

US 2024/0202666 A1    Jun. 20, 2024

(51) Int. Cl.
*G06Q 10/1053*    (2023.01)
*G06Q 40/12*    (2023.01)

(52) U.S. Cl.
CPC ....... *G06Q 10/1053* (2013.01); *G06Q 40/125* (2013.12)

(58) Field of Classification Search
CPC ............ G06Q 10/1053; G06Q 40/125; G06Q 10/105; G06Q 10/06398; G06Q 10/10; G06Q 30/08; G06Q 10/063114; G06Q 10/0635; G06Q 10/0639; G06Q 20/4016; G06Q 20/409; G06Q 30/0201; G06Q 40/08; G06Q 50/2053; G06Q 50/26; G06Q 50/265; G06Q 30/0601; G06N 20/00; G06N 5/04; G06F 16/24578; G06F 16/95; G06F 21/60

USPC .......................................................... 705/32
See application file for complete search history.

(56) References Cited

U.S. PATENT DOCUMENTS

| | | | |
|---|---|---|---|
| 11,537,747 B1 * | 12/2022 | Sharma | G06N 7/01 |
| 2012/0078804 A1 * | 3/2012 | Scarborough | G06Q 10/1053 |
| | | | 705/321 |
| 2016/0026917 A1 * | 1/2016 | Weisberg | G06N 7/01 |
| | | | 706/46 |
| 2020/0356875 A1 * | 11/2020 | Wang | G06N 5/04 |

FOREIGN PATENT DOCUMENTS

WO    WO-2012151198 A1 *    11/2012    ............ G06N 3/08

* cited by examiner

*Primary Examiner* — Avia Salman
(74) *Attorney, Agent, or Firm* — Foley & Lardner LLP (57) ABSTRACT

Disclosed herein are systems and methods for predicting unemployment rates. A computing device may construct a predictive model based at least in part on an iterative analysis of a first set of sample data. The first set of sample data can comprise payroll data associated with a plurality of employees, data from at least one employment survey report, and potentially other data. The computing device can generate predicted employment data using the predictive model based at least in part on a second set of sample data. The computing device can generate a report based at least in part on the predicted employment data.

18 Claims, 5 Drawing Sheets

SYSTEMS AND METHODS FOR PREDICTING UNEMPLOYMENT RATES

BACKGROUND

In the area of human resource management, organizations may desire information regarding employments statistics and trends in particular industries and geographic regions. This information often comes from employment reports that are released periodically by governmental or other official entities. These employment reports may include the results of surveys given of various employers across numerous industries and geographic areas. This data may be used to assess and predict unemployment rates.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for predicting unemployment rates. While employment survey reports may provide valuable information on unemployment rates and other employment trends in various geographic areas and industries, these reports may not always be reliable for various reasons. For example, because these reports are based on surveys, the data may be flawed because of untruthful answers given to survey questions. As another example, because these reports are oftentimes only released monthly, the data they contain may become inaccurate or unhelpful in the weeks between reports.

To address these issues, machine learning techniques can be used to accurately predict unemployment rates and other employment statistics included in monthly employment survey reports. These techniques can use previous survey reports, employer payroll records, and various other types of data to predict unemployment rates and other employment data. Using machine learning to predict employment data can thereby mitigate both the biases inherent in survey data and the unavailability of up-to-date data in the time between monthly reports.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
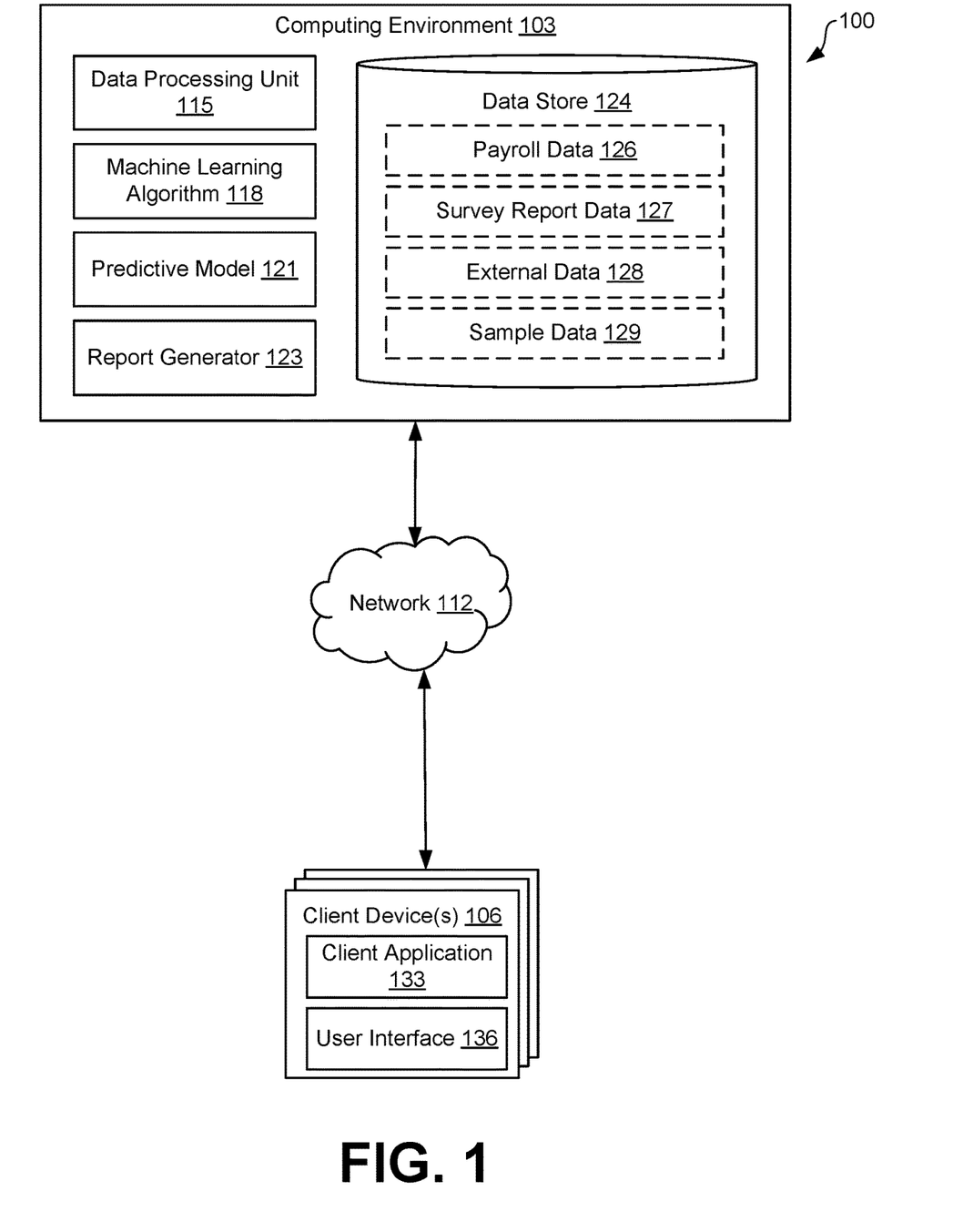
FIG. 1 depicts a network environment, according to various embodiments of the present disclosure.

FIG. 1 depicts a network environment 100 according to various embodiments. The network environment 100 can include a computing environment 103, one or more client devices 106, and potentially other computing devices. The computing environment 103 and the client devices 106 can be in data communication with each other via a network 112.

The network 112 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, a computing environment 103 can employ a plurality of computing devices that can be arranged in one or more server banks or computer banks or other arrangements. Such computing devices can be located in a single installation or can be distributed among many different geographical locations. For example, a computing environment 103 can include a plurality of computing devices that together can include a hosted computing resource, a grid computing resource or any other distributed computing arrangement. In some cases, a computing environment 103 can correspond to an elastic computing resource where the allotted capacity of processing, network, storage, or other computing-related resources can vary over time.

Various applications or other functionality can be executed in the computing environment 103. The components executed on the computing environment 103 can include a data processing unit 115, a machine learning algorithm 118, a predictive model 121, and potentially other applications.

Also, various data is stored in a data store 124 that is accessible to the computing environment 103. The data store 124 can be representative of a plurality of data stores 124, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 124 is associated with the operation of the various applications or functional entities described below. This data can include payroll data 126, survey report data 127, external data 128, sample data 129, and potentially other data.

The payroll data 126 can represent data generated during payroll operations performed for employers. The payroll data 126 can include payroll records associated with individual employees. Payroll data for an individual employee can include various data parameters such as, for example, gross pay, net pay, withholding, and benefits, as well as personally identifiable information associated with the employee and with the associated employer.

The survey report data 127 can represent employment statistics taken from surveys conducted by governmental or other official entities. The survey report data 127 can include, as an example, data from the Current Employment Statistics (CES) report produced by the United States Bureau of Labor Statistics (BLS). The CES program, also known as the payroll survey or the establishment survey, is a monthly survey of approximately 145,000 businesses and government agencies representing approximately 697,000 worksites throughout the United States. From the sample, CES produces and publishes employment, hours, and earnings estimates for the nation, states, and metropolitan areas at detailed industry levels.

The external data 128 can represent data received from one or more of the external data sources. For example, the external data 128 can include web data scraped from jobs postings by industry, job type, and geographic location. As another example, the external data 128 can include sentiment data obtained from social media platforms. This sentiment data can reflect social media discussion about a person's unemployment or about a person being employed and satisfied or unsatisfied with a current employment. As an additional example, the external data 128 can include weather data. The weather data can reflect data on catastrophic weather patterns or prolonged cold or hot weather periods that can increase or decrease job growth in different industries. As yet another example, the external data 128 can include cellular tracking data. The cellular tracking data can reflect the number of cellular device users in various locations such as retail stores, commercial offices, and industrial sites over a period of time. As still another example, the external data 128 can include satellite imagery data. The satellite imagery data can reflect the movement over time of industrial equipment and traffic to and from commercial or industrial sites.

The sample data 129 can comprise data aggregated from the payroll data 126, survey report data 127, external data 128. Sample data 129 can be divided into a random training subset and a random test subset to help construct a predictive model 121. In addition, predicted employment 130 data can be generated using the sample data 129.

The predicted employment data 130 can represent data that is predictive of employment data included in future employment survey reports. This predicted employment data 130 can include, for example, predicted employment and unemployment rates in various industries and geographic areas. The predicted employment data 130 can be generated by a predictive model 121 using sample data 129. In some implementations, the report generator 123 can generate a report using the predicted employment data 130 and provide it to the client device 106.

The data processing unit 115 can be executed to process the payroll data 126, survey report data 127, and external data 128. The data processing unit 115 can aggregate the payroll data 126, survey report data 127, and external data 128 to generate sample data 129. In some implementations, the data processing unit 115 can also anonymize the payroll data 126 to remove personally-identifiable and employer-identifiable information from the payroll data 126.

The machine learning algorithm 118 can be executed to construct a predictive model 121. The machine learning algorithm 118 can construct and train the predictive model 121 by performing an iterative analysis on sample data 129. The iterative analysis can include, for example, applying a machine learning algorithm 118 to a random training subset of the sample data 129 to construct a predictive model 121, applying a random test subset of the sample data 129 to the predictive model 121 to generate test result data, and determining whether the test result data meets or exceed a predetermined accuracy threshold. The iterative analysis can be repeated until the test result data generated by the predictive model 121 meets or exceeds the predetermined accuracy threshold.

The predictive model 121 can be used to generate predicted employment data 130 based on an input of sample data 129. A predictive model 121 can be constructed using the machine learning algorithm 118, which can employ, for example, supervised machine learning, unsupervised machine learning, or reinforcement machine learning.

The report generator 123 can be executed to generate a report based on output of the predictive model 121. The report generator 123 can compare predicted employment data 130 with survey report data 127. The report generator 123 can then generate a percentage score for the predicted employment data 130 based at least in part on this comparison. In some implementations, the report generator 123 can also generate a ranking among various subdivisions of the predicted employment data such as, for example, geographic regions or industries.

The client device 106 is representative of a plurality of client devices that can be coupled to the network 112. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can be configured to execute various applications such as a client application 133 or other applications. The client application 133 can be executed by the client device 106 to allow a user of the client device 106 to interact with the report generator 123 to obtain a report including predicted employment data 130. To this end, the client application 133 can include a browser, a dedicated application, or other executable, and the user interface can include a network or web page, an application screen, or other user mechanism for obtaining user input. The client device 106 can be configured to execute applications beyond the client application 133 such as email applications, social networking applications, word processors, spreadsheets, or other applications.

The client application 133 can generate a user interface 136 in a display of the client device 106. This user interface 136 can display reports received from the report generator 123. In some implementations, the client application 133 can provide one or more data visualization tools to display predicted employment data 130. For example, the client application 133 can enable a user to filter predicted employment data 130 by particular geographic areas, industries, or job types to display predicted employment data 130 that is particularly relevant to the user.

Next, a general description of the operation of the various components of the network environment 100 is provided. Although this general description provides one example of the interactions between the various components are included within the various embodiments of the present disclosure. Additional details about the operation of, or interactions between, the various components of the network environment 100 are provided in FIGS. 2 and 3.

To begin, survey report data 127 and potentially external data 128 can be received from one or more of the external data sources and stored in the data store 124. The survey report data 127 such as, for example, employment statistics produced by the BLS. The external data 128 can include, for example, web scraped data, sentiment data, weather data, cellular tracking data, or satellite imagery data.

The data processing unit 115 can then process the payroll data 126, survey report data 127, and external data 128. Processing can include aggregating the payroll data 126, survey report data 127, and external data 128 into sample data 129. Processing can also include parsing the payroll data 126 to anonymize the payroll data 126. Anonymizing the sample data 129 can include removing any personally-identifiable information or employer-identifiable information from the sample data 129. The data processing unit 115 can then aggregate the payroll data 126 with the survey report data 127 and external data 128 to generate sample data 129. In some implementations, the data processing unit 115 can aggregate data from a specified period of time or based on other specified criteria. The data processing unit 115 can provide the sample data 129 to the machine learning algorithm 118.

The machine learning algorithm 118 can then construct a predictive model 121. The machine learning algorithm 118 can construct the predictive model 121 by performing an iterative analysis on sample data 129 received from the data processing unit 115. The iterative analysis can include, for example, applying a machine learning algorithm 118 to a random training subset of the sample data 129 to construct a predictive model 121, applying a random test subset of the sample data 129 to the predictive model 121 to generate test result data, and determining whether the test result data meets or exceed a predetermined accuracy threshold.

The machine learning algorithm 118 can employ, for example, supervised machine learning, unsupervised machine learning, or reinforcement machine learning. When using supervised machine learning, the machine learning algorithm 118 can be provided with a random test subset of the sample data 129, as well as survey report data 127. The machine learning algorithm 118 can proceed through a trial-and-error process to identify patterns between the test subset and the survey report data 127. The machine learning algorithm 118 can eventually construct a predictive model 121 capable of reproducing the same underlying rules with new data. Examples of supervised machine learning algorithms can include neural networks, decision trees, regression analysis, k-nearest neighbors, and support vector machines.

When using unsupervised machine learning, the random test subset of the sample data 129 and the survey report data 127 can be provided to the machine learning algorithm 118 as an unlabeled dataset. That way, the machine learning algorithm 118 can decipher unknown patterns and create its own labels. Examples of unsupervised machine learning algorithms can include association analysis, descending clustering, or k-means clustering.

When using reinforcement machine learning, the machine learning algorithm 118 can continually improve using feedback from application to subsequent survey report data 127. In contrast to supervised and unsupervised machine learning, the machine learning algorithm 118 does not reach an endpoint after a predictive model 121 is constructed and is capable of producing test result data that meets or exceeds the predetermined accuracy threshold. A reinforcement machine learning algorithm can include, for example, Q-learning.

Once a predictive model 121 has been constructed, the machine learning algorithm 118 can provide the test subset of the sample data 129 to the predictive model 121 to test the accuracy of the test result data output by the predictive model 121. Values from the predicted employment data 130 can be compared to corresponding values in survey report data 127. The predictive model's 121 accuracy can be evaluated by, for example, using mean absolute error to calculate an accuracy score for each aspect of the predicted employment data 130. The machine learning algorithm 118 can then determine whether this accuracy score meets or exceeds a predefined accuracy threshold. If the average accuracy score fails to meet or exceed the predefined error threshold, then the machine learning algorithm can conclude the iterative analysis. Otherwise, the machine learning algorithm 118 can repeat the iterative analysis process after re-randomizing the training and test subsets of the sample data 129. The machine learning algorithm 118 can repeat the iterative analysis process until the average error accuracy meets or exceeds the predefined accuracy threshold.

The predictive model 121 can then generate predicted employment data 130 based on sample data 129. In some implementations, the predictive model 121 can generate predicted employment data 130 periodically. For example, if new survey report data 127 is released monthly, the predictive model 121 can generate new predicted employment data 130 weekly or bi-weekly. Between released of survey report data 127, the predictive model 121 can use a most recent set of survey report data 127 as part of the sample data 129. Likewise, the predictive model 121 may use a different set of survey report data 127 during training than when generating the predicted employment data 130. In some implementations, the predictive model 121 can accord less weight to the survey report data 127 when generating the predicted employment data 130 if more time has passed since the survey report data 127 was released.

Once the predictive model 121 has been trained, the predictive model 121 can output predicted employment data 130 using the sample data 129. In some implementations, the predictive model 121 can generate predicted employment data 130 given a set of variables such as, for example, a plurality of different geographic regions, industries, or time periods. The output of the predictive model 121 can be stored in the data store 124 as predicted employment data 130.

The report generator 123 can then generate a predicted employment report using the predicted employment data 130. The predicted employment report can include predicted employment data presented in a similar manner to an employment survey report. In some implementations, the predicted employment can include a comparison of the predicted employment data 130 with survey report data 127. Based on this comparison, the report generator 123 can calculate a score for the predicted employment data 130 indicating how accurately it predicted the survey report data 127. The report generator 123 can provide the predicted employment report to the client device 106 in response to a request from the client device 106.

Figure 2:
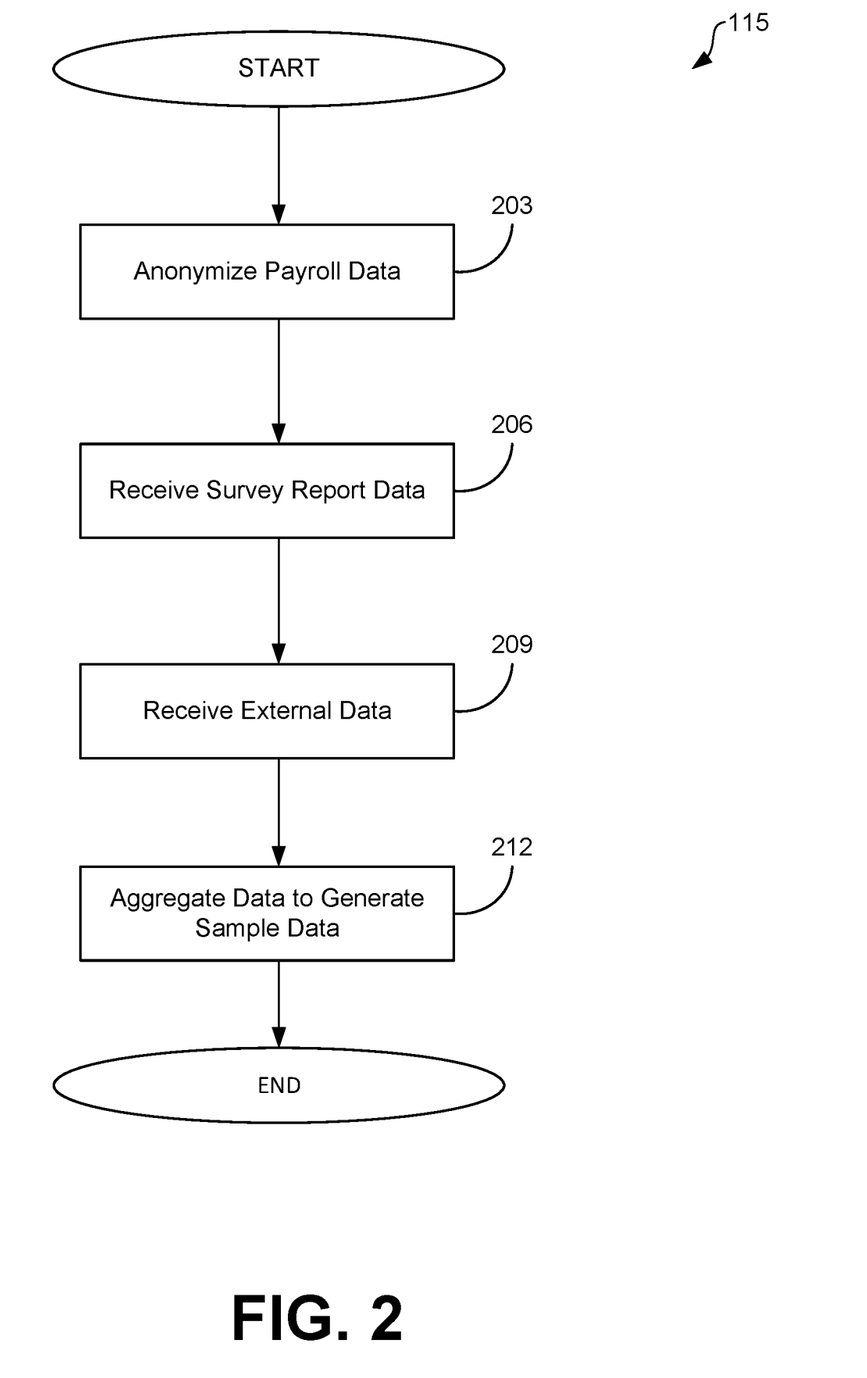
FIG. 2 depicts a flowchart that provides one example of the operation of a portion of a data processing unit, according to various embodiments of the present disclosure.

Turning to FIG. 2, show is a flowchart that provides one example of the operation of a portion of the data processing unit 115. The flowchart of FIG. 2 provides merely an example of the many different types of functional arrangements that can be employed to implement the operation of the depicted portion of the data processing unit 115. As an alternative, the flowchart of FIG. 2 can be viewed as depicting an example of elements of a method implemented within the network environment 100. Turning to FIG. 2, show is a flowchart that provides one example of the operation of a portion of the data processing unit 115. The flowchart of FIG. 2 provides merely an example of the many different types of functional arrangements that can be employed to implement the operation of the depicted portion of the data processing unit 115. As an alternative, the flowchart of FIG. 2 can be viewed as depicting an example of elements of a method implemented within the network environment 100.

At step 203, the data processing unit 115 can anonymize payroll data 126. The payroll data 126 stored in the data store 124 can include data parameters for individual employees such as, for example, gross pay, net pay, withholding, benefits, personally-identifiable information associated with the individual employees, and employer-identifiable information associated with employers. The data processing unit 115 can parse the payroll data 126 to identify instances of personally-identifiable and employer-identifiable information within the payroll data 126. For each of these instances, the data processing unit 115 can replace the identifiable information with a generic placeholder that anonymizes the identified employee or employer.

At step 206, the data processing unit 115 can receive survey report data 127. The survey report data 127 can be issued by a governmental, industrial, or other official entity such as the BLS. The survey report data 127 can include data regarding publishes employment, hours, and earnings estimates for the nation, states, and metropolitan areas at detailed industry levels. The survey report data 127 can be received periodically when it is issued, and each set of survey report data 127 can be used to help predict future instances of the survey report data 127.

At step 209, the data processing unit can receive external data 128. The external data can include various types of data from various external data sources. For example, the external data 128 can include sentiment data obtained from social media platforms regarding employment; weather data associated with catastrophic weather patterns or prolonged periods of hot or cold weather that may affect job growth in particular geographic areas and/or industries; cellular tracking data that indicates how popular or well-trafficked locations such as retail stores, commercial offices, and industrial sites are during particular time periods and in particular geographic locations; satellite imagery data that reflects the movement of industrial equipment and traffic to and from industrial sites during particular periods of time; and potentially other data concerning events or trends that could affect unemployment rates.

At step 212, the data processing unit 115 can aggregate the payroll data 126, survey report data 127, and external data 128 to generate sample data 129. The sample data 129 can be divided up into multiple random subsets and used to train a predictive model 121. In addition, the sample data 129 can be input into the predictive model 121 to generate predicted employment data 130. The process can then proceed to completion.

Figure 3:
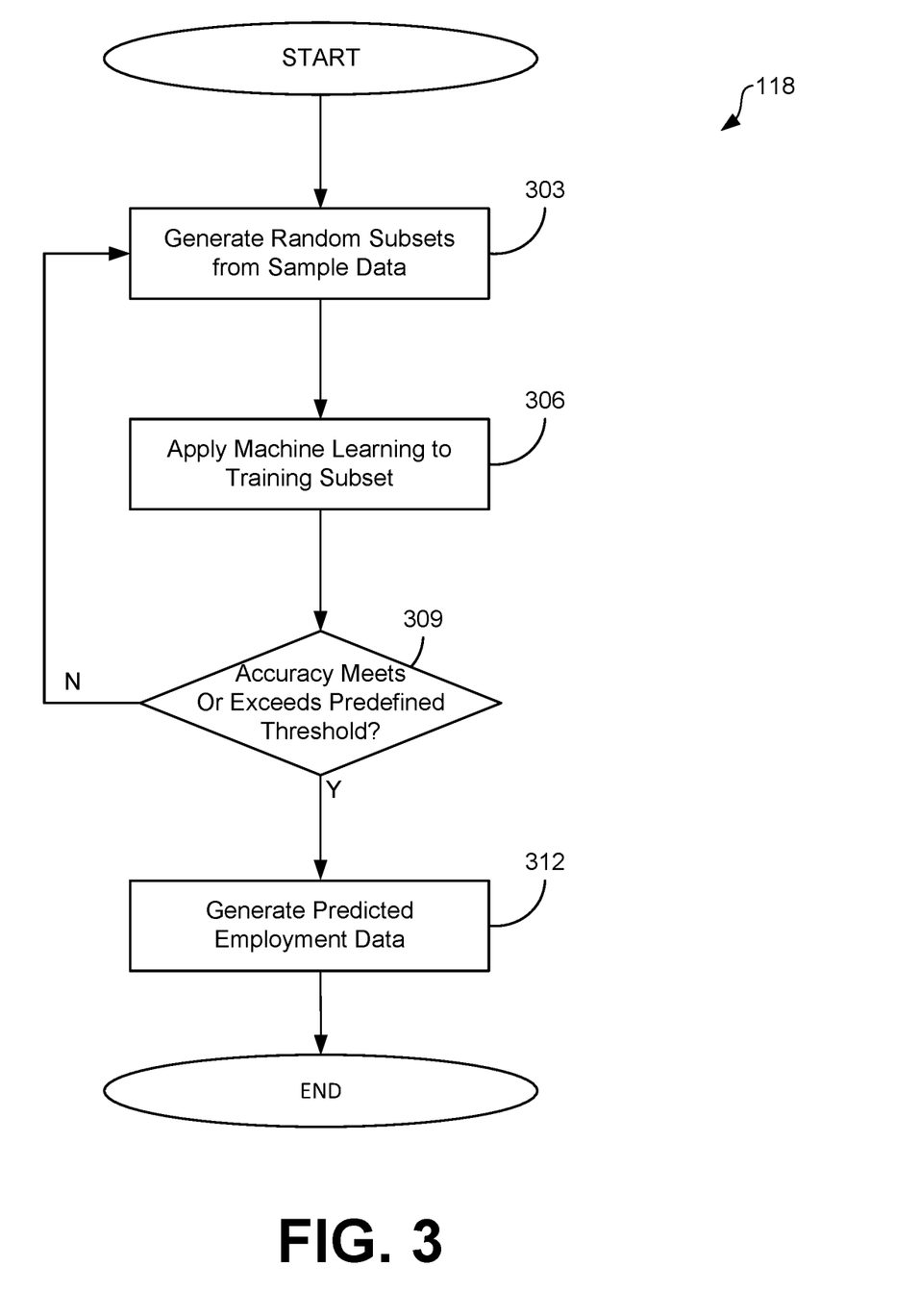
FIG. 3 depicts a flowchart that provides one example of the operation of a portion of a machine learning algorithm a flowchart that provides one example of the operation of a portion of the machine learning algorithm, according to various embodiments of the present disclosure.

Turning to FIG. 3, shown is a flowchart that provides one example of the operation of a portion of the machine learning algorithm 118. The flowchart of FIG. 3 provides merely an example of the many different types of functional arrangements that can be employed to implement the operation of the depicted portion of the machine learning application 118. As an alternative, the flowchart of FIG. 3 can be viewed as depicting an example of elements of a method implemented within the network environment 100.

At step 303, the machine learning algorithm 118 can generate random subsets of data from the sample data 129. For example, the sample data 129 can be randomly dived into a training subset and a test subset. The training subset can be used to construct and train a predictive model 121. The test subset can be used to test an accuracy of the predictive model 121 against survey report data 127.

At step 306, the machine learning algorithm 118 can be applied to the training subset of the sample data 129. In particular, the machine learning algorithm 118 can perform an iterative analysis on the training subset to construct and train a predictive model 121. The machine learning algorithm 118 can employ machine learning techniques such as supervised or unsupervised learning to decipher patterns within the training subset and survey report data 127 and thereby build the predictive model 121.

At step 309, the machine learning algorithm 118 can determine whether an accuracy of test result data meets or exceeds a predefined accuracy threshold. Test result data can include data generated when applying the newly-constructed predictive model 121 to a test subset of the sample data 129. The predefined accuracy threshold can indicate whether the test result data produced by the predictive model 121 reaches a desired level of accuracy compared to subsequently release survey report data 127. The machine learning algorithm 118 can evaluate the accuracy of the predictive model 121 using, for example, an accuracy score calculated using mean absolute error. If the accuracy of the test result data does meet or exceed the predefined accuracy threshold, the process can proceed to step 312. Otherwise, the process can proceed back to step 303.

At step 312, the machine learning algorithm 118 can cause the predictive model 121 to generate predicted employment data 130. The predicted employment data 130 can be generated using sample data 129 that may include more recent data than the sample data 129 used to construct and train the predictive model 121. The predicted employment data 130 can attempt to reflect future values of survey report data 127. The predictive model 121 can generate predicted employment data 130 given a set of variables such as, for example, a plurality of different geographic regions, industries, or time periods. The process can then proceed to completion.

Figure 4:
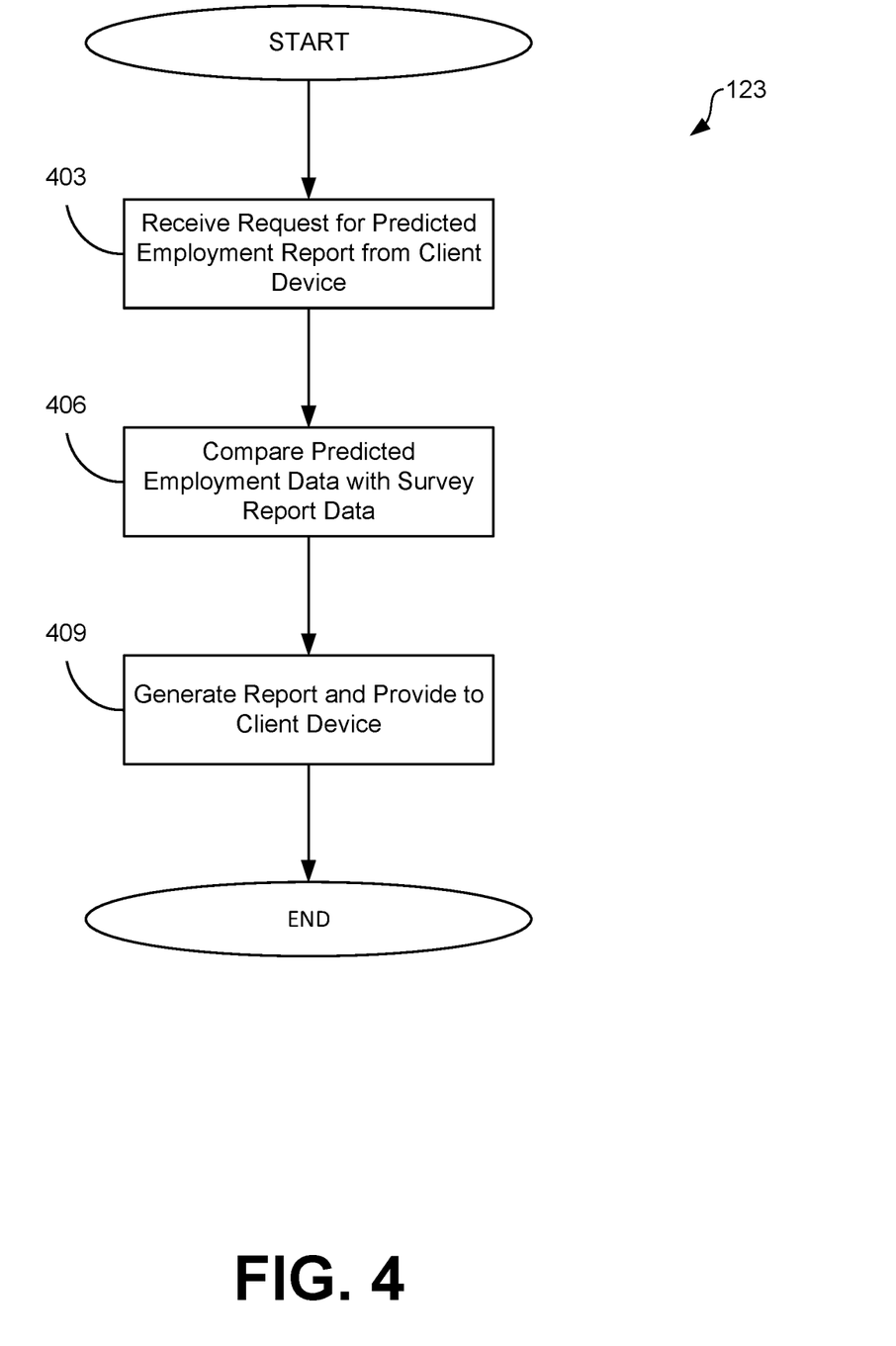
FIG. 4 depicts a flowchart that provides one example of the operation of a portion of a report generator, according to various embodiments of the present disclosure.

Turning to FIG. 4, shown is a flowchart that provides one example of the operation of a portion of the report generator 123. The flowchart of FIG. 4 provides merely an example of the many different types of functional arrangements that can be employed to implement the operation of the depicted portion of the report generator 123. As an alternative, the flowchart of FIG. 4 can be viewed as depicting an example of elements of a method implemented within the network environment 100.

At step 403, the report generator 123 receives a request for a predicted employment report from a client device 106. The request can specify one or more parameters based on which the report generator 123 can generate the predicted employment report. For example, the report generator 123 can specify a date range, one or more geographic regions, one or more industries, or one or more demographics to be included in the report.

At step 406, the report generator 123 can compare predicted employment data 130 with survey report data 127 to calculate an accuracy score for the predicted employment data. For example, for a particular predicted employment statistic—such as, for example, the unemployment rate for persons aged 18-24 during August 2022—the report generator 123 can compare that predicted statistic with a corresponding statistic from the survey report data 127. The report generator 123 can then calculate a percentage accuracy score based on this comparison. The report generator 123 can repeat this process for each statistic from the predicted employment data 127 that has a corresponding statistic in the survey report data 127.

At step 409, the report generator 123 can generate a predicted employment report and provide it to the client device 106. The predicted employment report can include the predicted employment data, as well as the accuracy score(s). The predicted employment report can be delivered to the client device 106, for example, via a Portable Document Format (PDF) document, using an application programming interface (API) feed provided by the report generator 123, or as part of a web-based data visualization tool.

Figure 5:
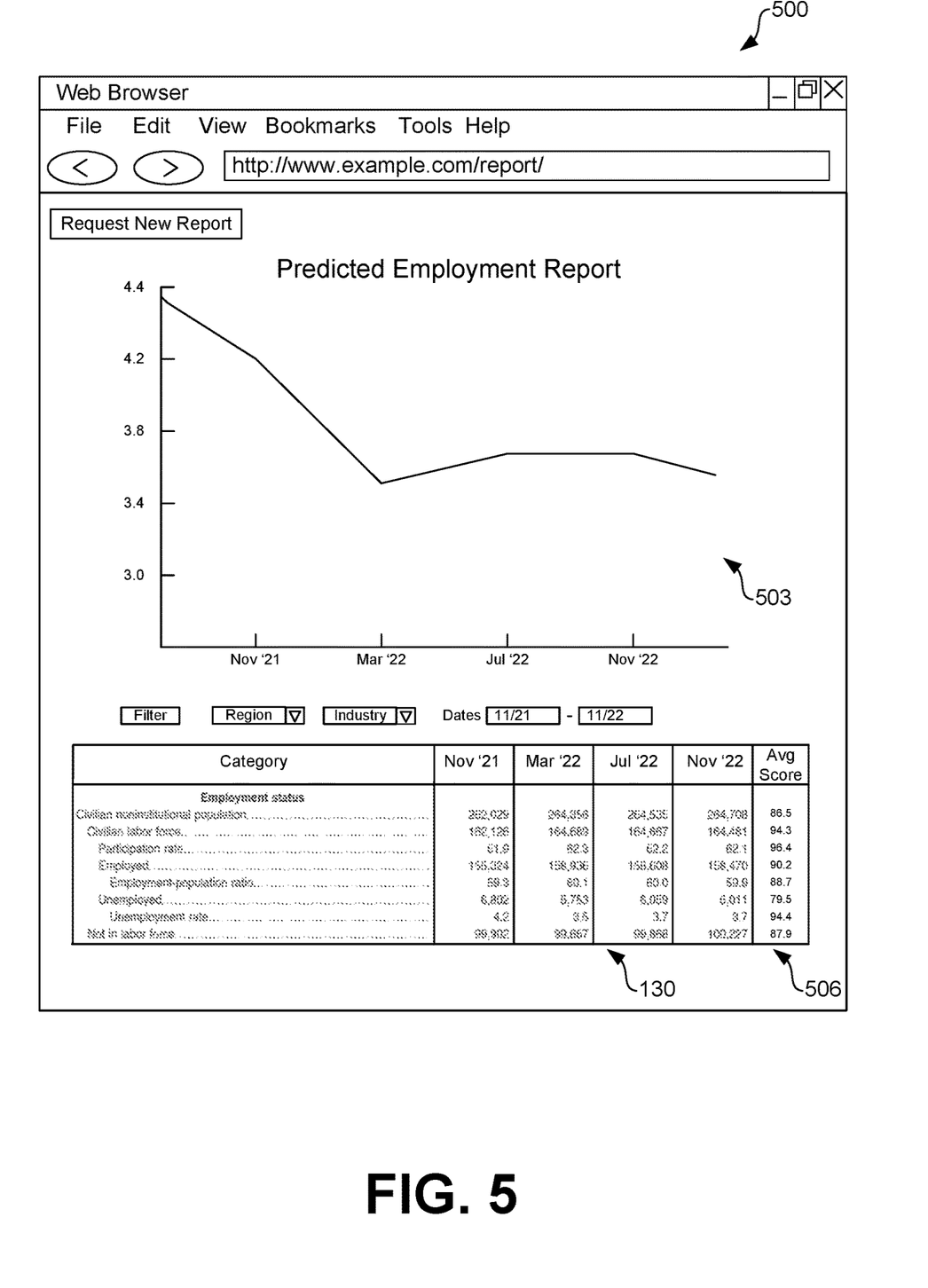
FIG. 5 depicts a pictorial diagram of an example user interface in the form of a web page rendered by a client application in a display of a client device, according to various embodiments of the present disclosure.

FIG. 5 shows a pictorial diagram of an example user interface 136 in the form of a web page rendered by a client application 133 in a display of the client device 106. The user interface 136 can display a predicted employment report 500 provided by the report generator 123 in response to a request from the client application 133. The predicted employment report 500 can include predicted employment data 130 generated by the predictive model 121. The predicted employment report 500 can permit a user of the client device 106 to filter the predicted employment data 130 displayed in the predicted employment report 500 based at least in part on, for example, a date range, geographic region, or industry. The predicted employment report 500 can further include one or more data visualization tools 503 permitting a user to visualize the predicted employment data 130 in various ways. The predicted employment report 500 can further include one or more accuracy scores 506. Each accuracy score can be based on a comparison of the predicted employment data 130 with corresponding data from survey report data 127.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, at least the following is claimed:

1. A system comprising:
one or more processors coupled with memory; and
machine-readable instructions stored in the memory that, when executed by the one or more processors, cause the one or more processors to:
collect, at a current time period, from at least two different types of data sources of a plurality of types of data sources within a data store, external data, payroll data, and survey data to generate sample data, wherein the plurality of types of data sources comprise a hierarchical database, an object-oriented database, and a hash table, wherein the external data comprises at least one of weather data, cellular tracking data, geographic data, or satellite data;
anonymize the payroll data to remove personally identifiable information from the payroll data;
generate the sample data corresponding to the at least two different types of data sources by aggregating the external data, the anonymized payroll data, and the survey data;
generate predicted employment data by using the sample data and executing a neural network, wherein to construct the neural network, the one or more processors:
train, using a machine learning algorithm, the neural network by providing a first training subset of the sample data to the neural network as an input to generate test data, wherein the machine learning algorithm uses the external data and the anonymized payroll data to randomly generate the first training subset of the sample data;
determine that the test data does not satisfy an error threshold based on a comparison between the test data and a first test subset of the sample data, wherein the machine learning algorithm randomly generates the first test subset of the sample data based on a weight assigned to the survey data, the weight indicating a deviation between the current time period and a publish date of the survey data;
responsive to the test data not satisfying the error threshold,
re-train, using the machine learning algorithm, the neural network by providing a second training subset of the sample data to the neural network as an input to generate second test data, wherein the machine learning algorithm uses the external data and the anonymized payroll data to randomly generate the second training subset of the sample data such that the second training subset is different from the first training subset; and
determine that the second test data satisfies the error threshold based on a comparison between the second test data and a second test subset, wherein the machine learning algorithm randomly generates the second test subset of the sample data using survey data that includes a weight that satisfies a threshold;

receive, from a client device, a request including one or more parameters to generate a user interface to display the generated predicted employment data;

responsive to receiving the request, generate, according to the one or more parameters, the user interface to display the generated predicted employment data that is generated using the neural network that is re-trained to satisfy the error threshold, wherein the user interface is configured with a first graphical user interface element corresponding to a filter capable of filtering the predicted employment data based on a geographic region or date range, a second graphical user interface element that uses one or more visualization tools configured to display a visual representation of the predicted employment data, and a third graphical user interface element corresponding to accuracy score for the predicted employment data, wherein the neural network generates the accuracy score based on a comparison between the predicted employment data and the sample data;

transmit, for display on a display device coupled with the client device, on a page rendered by an application executing on the client device, the user interface; and receive, from the application executing on the client device, a second input corresponding to the predicted employment data to improve the machine learning algorithm for subsequent survey data.

2. The system of claim 1, wherein the sample data comprises payroll data associated with a plurality of employees and data from at least one employment survey report.

3. The system of claim 2, wherein the sample data further comprises at least one of: data scraped from a plurality of online job postings, sentiment data associated with a plurality of discussions of employment, weather data associated with a catastrophic weather pattern a prolonged periods of hot or cold weather, cellular tracking data associated with a number of cellular device users in a plurality of locations over a period of time, or satellite imagery data associated with a movement of industrial equipment with respect to a geographic region.

4. The system of claim 1, wherein the one or more processors are further configured to construct the neural network based on an iterative analysis of sample data, wherein the iterative analysis comprises;
    randomly generate a training subset of the sample data and a test subset of the sample data;
    train the neural network based on applying a machine learning algorithm to the training subset; and
    determine whether an accuracy of test result data produced by the neural network meets or exceeds a predefined accuracy threshold.

5. The system of claim 4, wherein the machine learning algorithm comprises a supervised machine learning algorithm, an unsupervised machine learning algorithm, or a reinforcement machine learning algorithm.

6. The system of claim 1, wherein, the one or more processors are further configured to:
    perform a comparison of the predicted employment data with data from at least one employment survey report;
    calculate an accuracy score for the predicted employment data based on the comparison of the predicted employment data with the data from the at least one employment survey report;
    generate a report based on the predicted employment data and the accuracy score for the predicted employment data; and
    provide the report to a client device.

7. A method, comprising:
    collecting, by a one or more processors at a current time period, from at least two different types of data sources of a plurality of data sources within a data store, external data, payroll data, and survey data to generate sample data, wherein the plurality of types of data sources comprise a hierarchical database, an object-oriented database, and a hash table, wherein the external data comprises at least one of weather data, cellular tracking data, geographic data, or satellite data;
    anonymizing, by the one or more processors, the payroll data to remove personally identifiable information from the payroll data;
    generating, by the one or more processors, the sample data corresponding to the at least two different types of data sources by aggregating the external data, the anonymized payroll data, and the survey data;
    generating, by the one or more processors, predicted employment data by using the sample data and executing a neural network predictive model, wherein to construct the neural network:
        training, using a machine learning algorithm, the neural network by providing a first training subset of the sample data to the neural network as an input to generate test data, wherein the machine learning algorithm uses the external data and the anonymized payroll data to randomly generate the first training subset of the sample data;
        determining that the test data does not satisfy an error threshold based on a comparison between the test data and a first test subset of the sample data, wherein the machine learning algorithm randomly generates the first test subset of the sample data based on a weight assigned to the survey data, the weight indicating a deviation between the current time period and a publish date of the survey data;
        responsive to the test data not satisfying the error threshold,
        re-training, using the machine learning algorithm, the neural network by providing a second training subset of the sample data to the neural network as an input to generate second test data, wherein the machine learning algorithm uses the external data and the anonymized payroll data to randomly generate the second training subset of the sample data that is different from the first training subset; and
        determining that the second test data satisfies the error threshold based on a comparison between the second test data and a second test subset, wherein the machine learning algorithm randomly generates the second test subset of the sample data using survey data that includes a weight that satisfies a threshold;
    receiving, by the one or more processors from a client device, a request including one or more parameters to generate a user interface to display the generated predicted employment data;
    responsive to receiving the request, generating, by the one or more processors using the one or more parameters, the user interface to display the generated predicted employment data that is generated using the neural network predicted model that is re-trained to satisfy the error threshold, wherein the user interface is configured with a first graphical user interface element corresponding to a filter capable of filtering the predicted employment data based on a geographic region or date range, a second graphical user interface element that uses one or more visualization tools configured to display a visual representation of the predicted employment data, and a third graphical user interface element corresponding to accuracy score for the predicted employment data, wherein the neural network generates the accuracy score based on a comparison between the predicted employment data and the sample data;

transmit, for display on a display device coupled with a client device, on a page rendered by an application executing on the client device, the user interface; and receive, from the client device, a second input corresponding to the predicted employment data to improve the machine learning algorithm for subsequent survey data.

8. The method of claim 7, wherein the sample data comprises payroll data associated with a plurality of employees and data from at least one employment survey report.

9. The method of claim 8, wherein the sample data further comprises at least one of: data scraped from a plurality of online job postings, sentiment data associated with a plurality of discussions of employment, weather data associated with a catastrophic weather pattern a prolonged periods of hot or cold weather, cellular tracking data associated with a number of cellular device users in a plurality of locations over a period of time, or satellite imagery data associated with a movement of industrial equipment with respect to a geographic region.

10. The method of claim 7, further comprises constructing, by the one or more processors, the neural network based on an iterative analysis of the sample data, wherein the iterative analysis comprises:

randomly generating, by the one or more processors, a training subset of the sample data and a test subset of the sample data;

training, by the one or more processors, the neural network based on applying a machine learning algorithm to the training subset; and determining, by the one or more processors, whether an accuracy of test result data produced by the neural network meets or exceeds a predefined accuracy threshold.

11. The method of claim 10, wherein the machine learning algorithm comprises a supervised machine learning algorithm, an unsupervised machine learning algorithm, or a reinforcement machine learning algorithm.

12. The method of claim 7, further comprises:

performing, by the one or more processors, a comparison of the predicted employment data with data from at least one employment survey report;

calculating, by the one or more processors, an accuracy score for the predicted employment data based on the comparison of the predicted employment data with the data from the at least one employment survey report;

generating, by the one or more processors, a report based on the predicted employment data and the accuracy score for the predicted employment data; and providing, by the one or more processors, the report to a client device.

13. A non-transitory computer-readable medium embodying program instructions stored in a memory of a computing device that, when executed by one or more processors, cause the one or more processors to:

collect, at a current time period, from at least two different types of data sources of a plurality of types of data sources within a data store, external data, payroll data, and survey data to generate sample data, wherein the plurality of types of data sources comprise a hierarchical database, an object-oriented database, and a hash table, wherein the external data comprises at least one of weather data, cellular tracking data, geographic data, or satellite data;

anonymize the payroll data to remove personally identifiable information from the payroll data;

generate the sample data corresponding to the at least two different types of data sources by aggregating the external data, the anonymized payroll data, and the survey data;

generate predicted employment data by using the sample data and executing a neural network, wherein to construct the neural network, the one or more processors:

train, using a machine learning algorithm, the neural network by providing a first training subset of the sample data to the neural network as an input to generate test data, wherein the machine learning algorithm uses the external data and the anonymized payroll data to randomly generate the first training subset of the sample data;

determine that the test data does not satisfy an error threshold based on a comparison between the test data and a first test subset of the sample data, wherein the machine learning algorithm randomly generates the first test subset of the sample data based on a weight assigned to the survey data, the weight indicating a deviation between the current time period and a publish date of the survey data;

responsive to the test data not satisfying the error threshold, re-train, using the machine learning algorithm, the neural network by providing a second training subset of the sample data to the neural network as an input predictive model to generate second test data, wherein the machine learning algorithm uses the external data and the anonymized payroll data to randomly generate the second training subset of the sample data such that the second training subset is different from the first training subset; and determine that the second test data satisfies the error threshold based on a comparison between the second test data and a second test subset, wherein the machine learning algorithm randomly generates the second test subset of the sample data using survey data that includes a weight that satisfies a threshold;

receive, from a client device, a request including one or more parameters to generate a user interface to display the generated predicted employment data;

responsive to receiving the request, generate, according to the one or more parameters, the user interface to display the generated predicted employment data that is generated using the neural network that is re-trained to satisfy the error threshold, wherein the user interface is configured with a first graphical user interface element corresponding to a filter capable of filtering the predicted employment data based on a geographic region or date range, a second graphical user interface element that uses one or more visualization tools configured to display a visual representation of the predicted employment data, and a third graphical user interface element corresponding to accuracy score for the predicted employment data, wherein the neural network generates the accuracy score based on a comparison between the predicted employment data and the sample data;

transmit, for display on a display device coupled with a client device, on a page rendered by an application executing on the client device, the user interface; and receive, from the client device, a second input corresponding to the predicted employment data to improve the machine learning algorithm for subsequent survey data.

14. The non-transitory computer-readable medium of claim 13, wherein the sample data comprises payroll data associated with a plurality of employees and data from at least one employment survey report.

15. The non-transitory computer-readable medium of claim 14, wherein the sample data further comprises at least one of: data scraped from a plurality of online job postings, sentiment data associated with a plurality of discussions of employment, weather data associated with a catastrophic weather pattern a prolonged periods of hot or cold weather, cellular tracking data associated with a number of cellular device users in a plurality of locations over a period of time, or satellite imagery data associated with a movement of industrial equipment with respect to a geographic region.

16. The non-transitory computer-readable medium of claim 13, wherein the program instructions cause the one or more processors to construct the neural network based on an iterative analysis of the sample data, wherein the iterative analysis comprises:
 randomly generate a training subset of the sample data and a test subset of the sample data;
 train the neural network based on applying a machine learning algorithm to the training subset; and
 determine whether an accuracy of test result data produced by the neural network meets or exceeds a predefined accuracy threshold.

17. The non-transitory computer-readable medium of claim 16, wherein the machine learning algorithm comprises a supervised machine learning algorithm, an unsupervised machine learning algorithm, or a reinforcement machine learning algorithm.

18. The non-transitory computer-readable medium of claim 13, wherein the program instructions further cause the computing device to at least:
 perform a comparison of the predicted employment data with data from at least one employment survey report;
 calculate an accuracy score for the predicted employment data based on the comparison of the predicted employment data with the data from the at least one employment survey report;
 generate a report based on the predicted employment data and the accuracy score for the predicted employment data; and
 provide the report to a client device.

* * * * *